United States Patent Office 3,778,438

Patented Dec. 11, 1973

3,778,438

4-AMINO-ISOXAZOLO[5,4-d]PYRIMIDINES AND NITRATES THEREOF

William R. J. Simpson, Mendham, N.J., assignor to Sandoz-Wander Inc., Hanover, N.J.

No Drawing. Filed May 30, 1972, Ser. No. 257,678
Int. Cl. C07d *51/46*
U.S. Cl. 260—256.4 F 12 Claims

ABSTRACT OF THE DISCLOSURE

Disclosed are compounds of the class of isoxazolo [5,4-d]pyrimidines which are substituted at the 4-position by an amino function bearing a hydroxyalkyl nitrate moiety, e.g., 4-(5-hydroxypentyl) amino-3-methyl-isoxazolo[5,4-d]pyrimidine nitrate. The compounds have pharmacological activity in animals and are useful, for example, as antianginal agents and in the treatment of shock. Also disclosed are the corresponding hydroxy intermediates useful in preparation of the nitrates and also useful as anti-anginal agents and in the treatment of shock.

This invention relates to isoxazolo[5,4-d]-pyrimidines which are substituted at the 4-position by an amino function bearing a hydroxyalkyl nitrate moiety. The invention also relates to pharmaceutical methods and compositions utilizing said compounds. The invention further relates to corresponding hydroxyalkyl substituted quinazolines useful as intermediates in preparation of said nitrates and also useful as pharmaceutical agents.

The compounds of the invention may be represented by the structural Formula I:

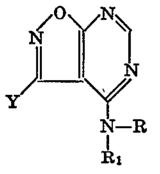

(I)

wherein

R is from the group of
(a) $—CH_2(—CH_2)_n—ONO_2$
(b) $—CH_2\left(\begin{matrix}R^\circ\\ |\\ —CH\end{matrix}\right)_n—ONO_2$, and
(c) $\begin{matrix}R_7\\ |\\ —CH(CH_2)_n—ONO_2\end{matrix}$
(d) $—CH_2(—CH_2)_z—N[CH_2(—CH_2)_y—ONO_2]_2$ $R_1$ is from the group of
(e) $—CH_2(—CH_2)_n—ONO_2$ when R is (a) as above defined,
(f) hydrogen, and
(g) lower alkyl of 1 to 4 carbon atoms, R′ is $—(CH_2—)_xCH_3$ or $—(CH_2)_yONO_2$,
R° is hydrogen, $—(CH_2—)_mCH_3$ or $—CH_2—)_yONO_2$, provided that one R° (and only one) is other than hydrogen, that the sum of *n* and *m* does not exceed 7 and that the sum of *n* and *y* does not exceed 8, or
R and $R_1$ together with the 4-amino nitrogen attached to the quinazoline ring form

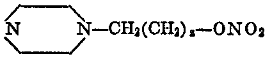

*n* is 1 to 7, preferably 3 to 5,
*m* is 0 to 4,
*x* is 0 or 1,
*y* is 1 to 4,
*z* is 1 to 4, and
Y is hydrogen or lower alkyl of 1 to 4 carbon atoms, e.g., methyl, or a pharmaceutically acceptable non-toxic acid addition salt thereof.

A preferred method for preparation of the compounds of Formula I involves in a Step A reaction the nitration of the corresponding hydroxy compound of Formula II:

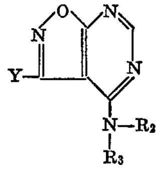

(II)

wherein Y is as defined and $R_2$ and $R_3$ are the non-nitrate bearing hydroxyalkyl substituents corresponding to R and $R_1$, respectively, i.e.:

$R_2$ is from the group of:
(a) $—CH_2(—CH_2)_n—OH$
(b) $—CH_2\left(\begin{matrix}R_a{}^\circ\\ |\\ —CH\end{matrix}\right)_n—OH$, and
(c) $\begin{matrix}R_a{}'\\ |\\ —CH(—CH_2)_n—OH\end{matrix}$
(d) $—CH_2(—CH_2)_z—N[—CH_2(—CH_2)_y—OH]_2$ $R_3$ is from the group of:
(e) $—CH(—CH_2)_n—OH$ when $R_2$ is (a) as above defined,
(f) hydrogen,
(g) lower alkyl of 1 to 4 carbon atoms, $R_a{}'$ is $—(CH_2—)_xCH_3$ or $—(CH_2)_yOH$,
$R_a{}^\circ$ is hydrogen, $—(CH_2)_mCH_3$ or $—(CH_2—)_yOH$, provided that one $R_a{}^\circ$ is other than hydrogen, that the sum of *n* and *m* does not exceed 7 and that the sum of *n* and *y* does not exceed 8, or
$R_2$ and $R_3$ together with the 4-amino nitrogen attached to the quinazoline ring form

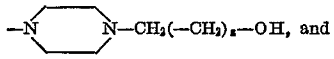

*n*, *m*, *x*, *y* and *z* are as defined.

The preparation of compounds I by Step A involves a nitration reaction which may be carried out in a manner known per se for nitrating hydroxyalkyl groups. A preferred method of conducting the nitration involves the reaction of a compound II with nitric acid in presence of a carboxylic acid anhydride which is preferably of from 3 to 8 carbon atoms, more preferably acetic acid anhydride. The reaction may be suiutably carried out in an organic solvent medium at temperatures in the range of from minus 70° C. to plus 50° C., preferably minus 10° C. to plus 20° C. The solvent medium for the reaction is preferably provided by employing a lower aliphatic carboxylic acid, e.g., acetic acid, although other well known organic solvents may be employed or the reaction may be carried out employing an excess of the carboxylic acid anhydride. The product compound I may be isolated from the reaction mixture of Step A by working up by established procedures.

A preferred method for preparation of compounds II involves a Step B reaction of a 4-halo-isoxazolo[5,4-d] pyrimidine of Formula III

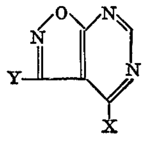

(III)

wherein Y is as defined and X is halo from the group of chloro or bromo, preferably chloro, with a compound of Formula IV:

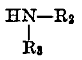
(IV)

wherein $R_2$ and $R_3$ are as defined.

The reaction of Step B is of known type and may be carried out in a conventional manner by subjecting a compound III to reaction with the compound IV in an organic solvent at elevated temperatures which may be suitably in the range of 20° C. to 150° C., preferably 30° C. to 100° C. The reaction is carried out in an inert organic solvent which may be any of several of the well-known conventional solvents, preferably an aromatic solvent such as benzene. Another preferred solvent is isopropanol. Alternately, the reaction may be carried out in the inert liquid medium provided by employing an excess of compound IV. An acid binding agent such as sodium carbonate may be also employed to advantage in the reaction, if desired. The reaction product compound II may be isolated from the reaction mixture of Step B by established procedures.

The compounds of Formulae III and IV are either known or may be prepared from known materials by established procedures. A literature reference for compounds III is P. Rajagopalan et al., Tetrahedron 23(8), 3541–3(1967)(Eng.).

Also within the scope of the novel compounds of the invention are pharmaceutically acceptable salts not materially affecting the pharmacological effect of the compounds of Formula I and Formula II. Such salts include the acid addition salts, e.g., the methane sulfonate, hydronitrate, hydrosulfate, fumarate, hydrochloride and maleate. It is convenient to prepare the compounds of Formula I as a hydronitrate addition salt. Such salts may be then readily converted to the free bases by conventional procedures. In preparing the free bases of the Formula I from the acid addition salts, it is also convenient to employ a buffer system, e.g., a system comprising a 1:1 molar mixture of acetic acid and sodium acetate, followed by working up by conventional procedures. The free bases may be readily converted into the hydronitrate and other acid addition salts by established procedures. The compounds II may be also prepared as acid addition salts and converted to free base form, and vice versa by conventional procedures.

The compounds of Formulae I and II and their pharmaceutically acceptable acid addition salts are useful because they possess pharmacological activity in animals. In particular, the compounds are useful as anti-anginal agents as indicated on intravenous administration (0.5 to 20 milligrams per kilogram) to the anesthetized dog and measurement of blood flow through the anterior descending branch of the left coronary artery.

For the above use, the compounds of the Formulae I and II may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compound used, the therapy desired and the mode of administration. However, satisfactory results are obtained when administered at a daily dosage of from about 0.15 milligram to about 75 milligrams per kilogram of body weight, preferably given orally in divided doses 2 to 4 times a day, or in sustained release form. For most large mammals the administration of from about 10 milligrams to about 500 milligrams of the compound per day provides satisfactory results and dosage forms suitable for internal administration comprise from about 2.5 milligrams to about 250 milligrams of the compound in admixture with a solid or liquid pharmaceutical carrier or diluent.

Various compounds of the Formula I are also useful as agents in the treatment of myocardial shock as indicated on intravenous administration (0.5 to 20 milligrams per kilogram) to the anesthetized dog and measuring the myocardial contracitile force with a Walton Brodie strain gage. The compounds of the formula I useful in the treatment of shock include those of the Formula Ia:

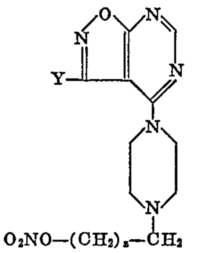
(Ia)

wherein Y and *z* are as above defined. A preferred compound for use in the treatment of shock is 4-[4-(2-hydroxyethyl)-1-piperazino]-3 - methylisoxazolo - [5,4 - d] pyramidine nitrate. In addition, the compound 4-(5-hydroxypentyl) - 3 - methyl - isoxazolo[5,4 - d]pyrimidine nitrate is also indicated for use in the treatment of myocardial shock.

The compounds useful in the treatment of myocardial shock may be administered for such purpose either orally or parenterally, preferably parenterally. The dosage administered for such use will vary of course depending upon the compound used, mode of administration and other known factors. However, in general, satisfactory results are obtained when administered at a dosage of from 0.01 to 200 milligrams per kilogram of body weight administered either daily or pro re nata with the lower range dosages of from 0.01 to 20 mg./kg. applicable to intravenous administration and the dosages of from 0.5 to 200 mg./kg. applicable to oral administration. For most large mammals the administration of from 0.5 to 100 milligrams intravenously pro re nata provides satisfactory results while oral administration of from 35 to 750 milligrams, which may be given in divided doses 2 to 6 times a day, also provides satisfactory results.

For the above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, inert diluents, granulating and disintegrating agents, binding agents, lubricating agents and the like. Parental administration may take place in conventional forms such as sterile solutions and suspensions which also may be prepared by conventional techniques. In general, the compositions of the invention adapted for either oral or parenteral administration may contain 1% to 90% by weight of the active ingredients in combination with the inert carrier, more usually 3% to 40%. Except for the use in the treatment of shocks the preferred pharmaceutical compositions from the standpoint of preparation and ease of administration are solid compositions, particularly hard-filled capsules and tablets.

A representative formulation is a capsule for oral administration 2 to 4 times a day to prevent or lessen the severity of anginal attacks and prepared by standard capsulating techniques to contain:

| Capsule ingredients: | Weight (mg.) |
|---|---|
| 4-(5 - hydroxypentyl)-3-methyl-isoxazolo[5,4-d] pyrimidine nitrate | 50 |
| Lactose | 300 |

Compositions for parenteral administration for use, for example, in the treatment of shocks, may be formulated by well-known methods to contain an effective amount of a compound I as active ingredient in a conventional inert carrier or suspension or solvent medium, together with other additives such as dispersing agents, wetting agents, buffering agents and other conventional ingredients, as desired.

A representative formulation for intravenous administration for treatment of shock (pro re nata) is a solution prepared by standard procedures and containing the following ingredients:

| Ingredient: | Weight (percent) |
|---|---|
| Compound I of Example 1 | 5 |
| Sodium chloride to make isotonic. | |
| Buffer agent to adjust pH. | |
| Ethanol, U.S.P. | 10–20 |
| Propylene glycol | 15–25 |
| Water for injection | 55–75 |

The following examples are given for the purpose of illustration only.

EXAMPLE 1

4 - [4 - (2 - hydroxyethyl) - 1 - piperazino] - 3 - methyl-isoxazolo[5,4 - d]pyrimidine nitrate maleate

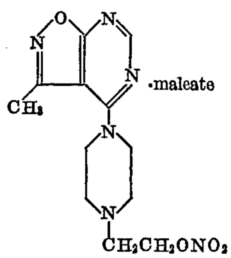

Step A: Preparation of 4-[4-(2-hydroxyethyl)-1-piperazino]-3-methyl-isoxazolo[5,4-d]pyrimidine.—To a solution of 2.5 g. of hydroxyethylpiperazine in 10 ml. of isopropanol is added 2.0 g. of anhydrous sodium carbonate and then 2.7 g. of 4-chloro-3-methyl-isoxazolo[5,4-d] pyrimidine is added portionwise with the evolution of heat. When the temperature of the resulting solution begins to decrease the solution is heated at reflux for 10 minutes. The resulting mixture is then filtered and the filtrate evaporated in vacuo. The resulting oil is chromatographed over silica gel and crystallized to obtain 4-[4-(2 - hydroxyethyl)-1-piperazino]-3-methyl-isoxazolo-[5,4-d]pyrimidine, M.P. 80–81° C.

Step B: Preparation of 4-[4-(2-hydroxyethyl)-1-piperazino]-3-methyl-isoxazolo[5,4-d]pyrimidne nitrate maleate.—A solution of 2.3 g. of the product of Step A in 3.0 ml. of dry acetic acid is added dropwise to a mixture of 4.9 ml. of acetic anhydride and 1.65 ml. of 90% nitric acid at between minus 5° C. to plus 5° C. After 25 minutes at about 0° C. the reaction mixture is added to cold dilute ammonium hydroxide solution and extracted three times with methylene chloride. The organic extracts are combined, dried, filtered and evaporated to dryness. The residue is dissolved in a mixture of methylene chloride and ethanol and 1.75 g. of maleic acid dissolved in ethanol is added. After standing, white crystals are obtained and are separated by filtration to obtain 4-[4-(2-hydroxyethyl)-1-piperazino] - 3 - methyl-isoxazolo[5,4-d] pyrimidino nitrate maleate, M.P. 121° C. (decomp.).

EXAMPLE 2

Following the procedure of Example 1, the following compounds are prepared:

(A–1) 4-(5-hydroxypentyl)amino-3-methyl-isoxazolo-[5,4-d]pyrimidine, M.P. 68–70° C.

(A–2) 4-(5-hydroxypentyl)amino-3-methyl-isoxazolo [5,4-d]pyrimidine nitrate, M.P. 83–84° C.

(B–1) 4-(5-hydroxypentyl)amino-isoxazolo[5,4-d] pyrimidine.

(B–2) 4-(5-hydroxypentyl)amino-isoxazolo[5,4-d] pyrimidine nitrate.

(C–1) 4-[3-bis(2-hydroxyethyl)aminopropyl]amino-3-methyl-isoxazolo[5,4-d]pyrimidine maleate, M.P. 106–110° C.

(C–2) 4-[3-bis(2-hydroxyethyl)aminopropyl]amino-3-methyl-isoxazolo[5,4-d]pyrimidine dinitrate maleate, M.P. 83° C. (decomp.).

(D–1) 4-(N-methyl-N-4-hydroxybutyl)amino-3-methyl-isoxazolo[5,4-d]pyrimidine.

(D–2) 4-(N-methyl-N-4-hydroxybutyl)amino-3-methyl-isoxazolo[5,4-d]pyrimidine nitrate.

What is claimed is:

1. A compound of the formula:

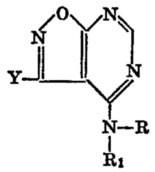

wherein

R is from the group of (a) $-CH_2(-CH_2)_n-ONO_2$ (b) $-CH_2\left(-\overset{R°}{\overset{|}{C}H}\right)_n-ONO_2$ and (c) $-\overset{R'}{\overset{|}{C}H}(-CH_2)_n-ONO_2$, (d) $-CH_2(-CH_2)_z-N[CH_2(-CH_2)_y-ONO_2]_2$ $R_1$ is from the group of (e) $-CH_2(-CH_2)_n-ONO_2$ when R is (a) as above defined, (f) hydrogen, and (g) lower alkyl of 1 to 4 carbon atoms, R′ is $-(CH_2-)_xCH_3$ or $-(CH_2)_yONO_2$, R° is hydrogen, $-(CH_2-)_mCH_3$ or $-(CH_2-)_yONO_2$, provided that one R° (and only one) is other than hydrogen, that the sum of *n* and *m* does not exceed 7 and that the sum of *n* and *y* does not exceed 8, or R and $R_1$ together with the 4-amino nitrogen attached to the quinazoline ring form

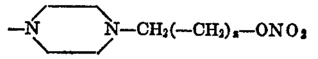

*n* is 1 to 7,
*m* is 0 to 4,
*x* is 0 or 1,
*y* is 1 to 4,
*z* is 1 to 4, and
Y is hydrogen or lower alkyl of 1 to 4 carbon atoms, or a pharmaceutically acceptable non-toxic acid addition salt thereof.

2. A compound of claim 1 in which R and $R_1$ together with the 4-amino nitrogen form:

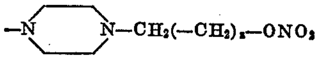

3. The compound of claim 2 in which Y is methyl and *z* is 1.

4. A compound of claim 1 in which R is $$-CH_2(-CH_2)_n-ONO_2$$

5. The compound of claim 4 in which Y is methyl, $R_1$ is hydrogen and *n* is 4.

6. The compound of claim 4 in which Y is hydrogen, $R_1$ is hydrogen and *n* is 4.

7. A compound of claim 1 in which R is $$-CH_2(-CH_2)_z-N[CH_2(-CH_2)_y-ONO_2]_2$$

8. The compound of claim 7 in which Y is methyl, $R_1$ is hydrogen, *z* is 2 and *y* is 1.

9. A compound of the formula:

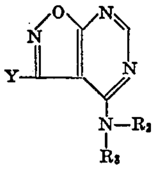

wherein $R_2$ is from the group of:

(a) $—CH_2(—CH_2)_n—OH$ (b) $—CH_2(—\overset{R°_a}{\overset{|}{C}}H)_n—OH$, and (c) $—\overset{R_a'}{\overset{|}{C}}H(—CH_2)_n—OH$ (d) $—CH_2(—CH_2)_z—N[—CH_2(—CH_2)_y—OH]_2$ $R_3$ is from the group of:

(e) $—CH_2(—CH_2)_n—OH$ when $R_2$ is (a) as above defined, (f) hydrogen, (g) lower alkyl of 1 to 4 carbon atoms, $R'_a$ is $—(CH_2—)_xCH_3$ or $—(CH_2—)_yOH$, $R°_a$ is hydrogen, $—(CH_2—)_mCH_3$ or $—(CH_2—)_yOH$, provided that one $R°_a$ is other than hydrogen, that the sum of *n* and *m* does not exceed 7 and that the sum of *n* and *y* does not exceed 8, or $R_2$ and $R_3$ together with the 4-amino nitrogen attached to quinazoline ring form

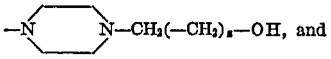

*n, m, x, y* and *z* are as defined in claim 1, or a pharmaceutically acceptable acid addition salt thereof.

10. A compound of claim 9 in which $R_2$ and $R_3$ together with the 4-amino nitrogen form:

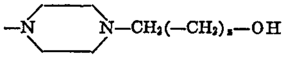

11. A compound of claim 9 in which $R_2$ is $$—CH_2(—CH_2)_n—OH$$

12. A compound of claim 9 in which $R_2$ is $$—CH_2(—CH_2)_z—N[—CH_2(—CH_2)_y—OH]_2$$

References Cited

UNITED STATES PATENTS 3,679,682 7/1972 Gibbons .......... 260—256.4

ALEX MAZEL, Primary Examiner

R. V. RUSH, Assistant Examiner

U.S. Cl. X.R.

424—251